United States Patent [19]

Robinson

[11] 4,155,186
[45] May 22, 1979

[54] ANTI-SHARK WEAPON

[76] Inventor: Robert T. Robinson, 302 9930 86th Ave., Edmonton, Alberta, Canada

[21] Appl. No.: 887,022

[22] Filed: Mar. 16, 1978

[51] Int. Cl.² ............................................. A01M 27/00
[52] U.S. Cl. ......................................... 42/1 TB; 43/84
[58] Field of Search ....................... 42/1R, 1 L, 1 TB; 43/84; 102/8, 10

[56] References Cited

U.S. PATENT DOCUMENTS

| | | | |
|---|---|---|---|
| 549,297 | 11/1895 | Sharp et al. | 102/8 |
| 848,544 | 3/1907 | Gassett | 102/8 |
| 1,884,721 | 10/1932 | Karr | 43/84 |

Primary Examiner—Charles T. Jordan
Attorney, Agent, or Firm—George H. Dunsmuir

[57] ABSTRACT

An anti-shark grenade which comprises concentric tubes of lightweight plastic, the outermost tube being a waterproof shell on the inside of which are located a plurality of percussion caps bearing against a waterproof tube containing an explosive charge fitting against a tube containing dehydrated blood cake bait and having a water permeable perforated closure. The innermost tube is a buoyancy tube sealed at both ends. Water causes the blood cake to dissolve thereby attracting the shark to the floating grenade. Upon biting by the shark, the grenade explodes.

4 Claims, 4 Drawing Figures

ANTI-SHARK WEAPON

FIELD OF THE INVENTION

This invention relates generally to an anti-shark weapon for use by swimmers, divers and shipwrecked persons.

DESCRIPTION OF THE PRIOR ART

The prior art, as exemplified by U.S. Pat. Nos. 3,747,247; 3,721,031; 3,529,548; 2,661,693; 2,353,798 or 1,884,721 is generally illustrative of the pertinent art but the aforementioned patents are non-applicable to the present invention. While the prior art expedients are generally acceptable for their intended purposes only, they have not proven entirely satisfactory in that they are either complex and expensive to manufacture, or bulky and inconvenient to use, or require unusual skill and/or dexterity to operate. As a result of the shortcomings of the prior art, typified by the above, there has developed a substantial need for improvement in this field.

The principal object of this invention is to provide an offensive weapon of this character which combines simplicity, strength and durability in a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

SUMMARY OF THE INVENTION

This invention resides in an anti-shark grenade which comprises concentric tubes of lightweight plastic, the outermost tube being a waterproof shell on the inside of which are located a plurality of percussion caps bearing against a waterproof tube containing an explosive charge fitting against a tube containing dehydrated blood cake bait and having a water permeable perforated closure. The innermost tube is a buoyancy tube sealed at both ends. Water causes the blood cake to dissolve thereby attracting the shark to the floating grenade. Upon biting by the shark, the grenade explodes.

BRIEF DESCRIPTION OF THE DRAWING:

In the accompanying drawing, in which is shown one of the various possible illustrative embodiments of this invention, wherein like reference character identify the same or like parts.

Figure 1:
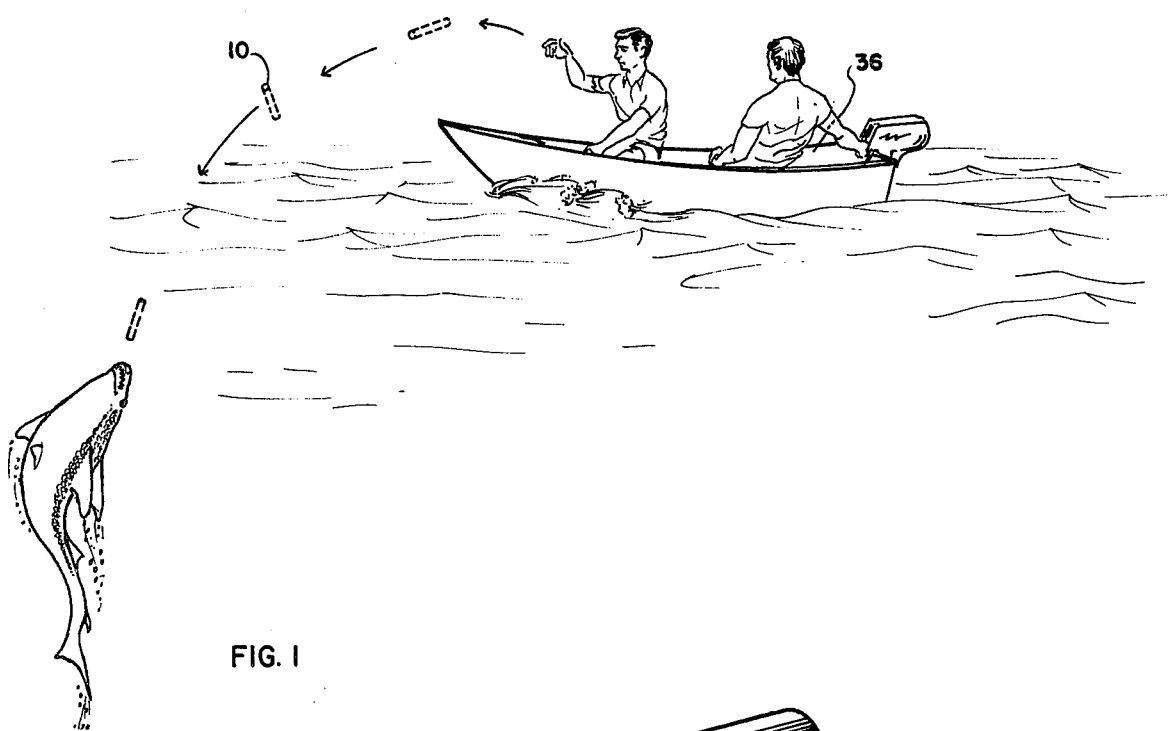
FIG. 1 is an isometric view showing use of the grenade by persons in a lifeboat.
Figure 2:
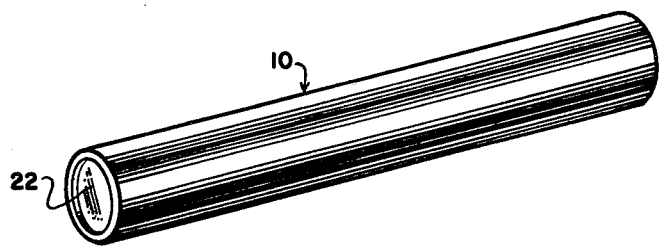
FIG. 2 is a perspective view of the grenade.
Figure 3:
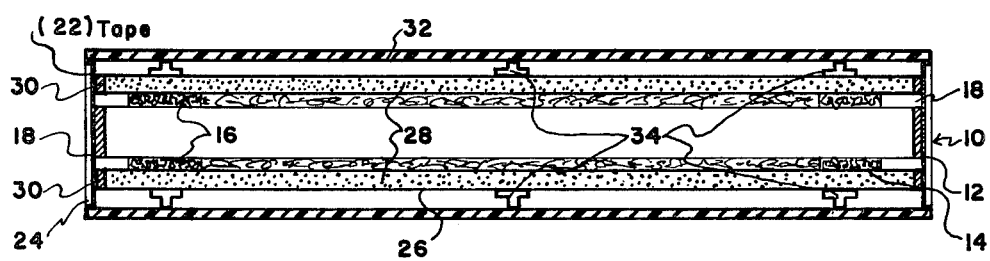
FIG. 3 is a sectional view thereof.
Figure 4:
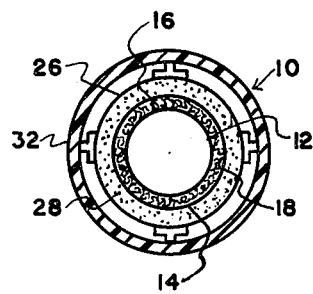
FIG. 4 is an end view of same.

DESCRIPTION OF THE PREFERRED EMBODIMENTS:

With reference to the drawing, there is shown and illustrated an anti-shark grenade constructed in accordance with the principles of the invention and designated generally by reference character 10. The illustrated tangible embodiment of the invention includes a plurality on concentric tubes usually about fifteen inches long and about two inches in diameter. The inner tube 12 is sealed at both ends and contains air. Its purpose is to make the grenade float about three feet below the water surface. So as to achieve neutral buoyancy, neither sinking to the bottom nor rising to the surface. Surrounding tube 12 is a tube 14 filled with a blood cake 16 of dehydrated blood or of synthetic blood composed of chemical flavoring extracts which are water-soluble, in particular, in salt water. The ends 18 of tube 14 are normally covered until ready to use by tape 22 which for convenience in assembly can cover entirely both ends of grenade 10. Preferably, for ease of removal, tape 22 will have lift tabs 24 integral therewith. Another plastic tube 26 is filled with an explosive charge 28 such as TNT or dynamite and has watertight ends 30. Intermediate the outside of tube 26 and the inside of outer plastic shell 32 are percussions caps or firing pins 34, of known design and use.

The grenade of the invention is adapted for inclusion in lifeboats and liferafts carried by boats and planes. Its size allows it to be carried also by swimmers and scuba divers, as needed.

FIG. 1 shows use of the grenade by men in lifeboat 36. After removing seal 22, the men have flung the grenade overboard. The blood scent and color caused by water dissolving the blood cake have attracted a shark. Upon biting the grenade, the charge explodes and will kill or disable the shark. Thus, an immediate danger to the men is avoided as other sharks will then attack the floating carcass or wounded shark thus gaining valuable time for the men by distracting the sharks toward other game.

The operation and use of the invention hereinabove described will be evident to those skilled in the art to which it relates from a consideration of the foregoing.

The present invention is believed to accomplish among others all of the objects and advantages herein set forth.

Without further analysis, the foregoing will so fully reveal the gist of this invention that those skilled in the art can by applying current knowledge thereto readily adapt it for various applications without omitting certain features which can constitute essential characteristics of the generic or specific aspects of this invention. Therefore, a more lengthy description is deemed unnecessary.

It is intended that various changes may be made in this invention in the practical development thereof, if desired. Such changes are comprehended within the meaning and range of equivalency of the following claims. The invention, therefore, is not to be restricted except as is necessitated by the prior art.

Having thus described the invention, what is claimed as new and to be secured by Letters Patent is:

1. An anti-shark weapon comprising a generally elongated body; a buoyancy compartment in said body adapted to cause said body to float below the water surface; bait means for producing the scent and color of blood when contacted by water; an explosive charge and percussion means adapted to set off said charge upon said body being bitten by a shark.

2. The invention is recited in claim 1, wherein said bait means consists of dehydrated blood.

3. The invention as recited in claim 2, wherein said blood is contained in a tube having perforated ends normally closed by sealing means having a lifting tab.

4. The invention as recited in claim 1, wherein said compartment consists of a central, hollow sealed tube, said bait means and said charge being contained in successive concentric tubes in an outer waterproof plastic shell; said percussion means being located between said shell and the chargecontaining tube.

* * * * *